(12) United States Patent
Ziller et al.

(10) Patent No.: US 9,147,148 B2
(45) Date of Patent: Sep. 29, 2015

(54) COMPACT ID TRANSMITTER COMPRISING AN NFC COMMUNICATIONS OPTION FOR A MOTOR VEHICLE ACCESS SYSTEM

(75) Inventors: Boris Ziller, Ratingen (DE); Dieter Brozio, Essen (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 71 days.

(21) Appl. No.: 13/995,609

(22) PCT Filed: Dec. 6, 2011

(86) PCT No.: PCT/EP2011/071956
§ 371 (c)(1),
(2), (4) Date: Sep. 5, 2013

(87) PCT Pub. No.: WO2012/084504
PCT Pub. Date: Jun. 28, 2012

(65) Prior Publication Data
US 2013/0341414 A1  Dec. 26, 2013

(30) Foreign Application Priority Data

Dec. 20, 2010  (DE) .......................... 10 2010 061 351

(51) Int. Cl.
*G06K 19/06* (2006.01)
*G06K 19/077* (2006.01)
(Continued)

(52) U.S. Cl.
CPC ...... *G06K 19/0775* (2013.01); *G06K 19/07783* (2013.01); *G07C 9/00944* (2013.01); *H01Q 1/3241* (2013.01); *H01Q 5/35* (2015.01); *H01Q 5/40* (2015.01); *H01Q 7/00* (2013.01)

(58) Field of Classification Search
CPC .................. G06K 19/0775; G06K 19/07749; G06K 19/0723; G06K 19/07783; H01Q 1/3241; H01Q 7/00

USPC ................................................... 235/487, 492
See application file for complete search history.

(56) References Cited

U.S. PATENT DOCUMENTS

2004/0230348 A1 * 11/2004 Mann et al. .................. 701/1
2005/0237220 A1 10/2005 Nolan et al.
(Continued)

FOREIGN PATENT DOCUMENTS

| EP | 1 376 762 A1 | 1/2004 |
| EP | 1 748 515 A1 | 1/2007 |

(Continued)

OTHER PUBLICATIONS

Rolf et al., "Near Field Communication (NFC) for Mobile Phones", Aug. 31, 2006, pp. 74-86 [Retrieved from the Internet: URL:http://www.es.1th.se/teorel/Publications/TEAT-5000-series/TEAT-5082.pdf (retrieved on 03/20/2012166) pp. 67-79.

(Continued)

*Primary Examiner* — Paultep Savusdiphol
(74) *Attorney, Agent, or Firm* — Fay Sharpe LLP

(57) ABSTRACT

An ID transmitter for a motor vehicle access system includes a printed circuit board which is enclosed by a plastic housing. An antenna subassembly arranged next to the printed circuit board is connected thereto and includes a carrier film carrying conductor tracks. The components include a power supply cell, an LF 3D coil assembly, and HF transceiver components, an NFC module and at least one controller component. The conductor tracks of the carrier film form an NFC antenna coil which is coupled to the NFC modules via the conductors of the printed circuit board. The carrier film is arranged substantially in a plane parallel to the printed circuit board and protrudes over the edge of the printed circuit board on all sides. The conductor tracks forming the NFC antenna coil are arranged primarily in the edge region of the carrier film protruding over the edge of the printed circuit board.

10 Claims, 3 Drawing Sheets

Figure 1:
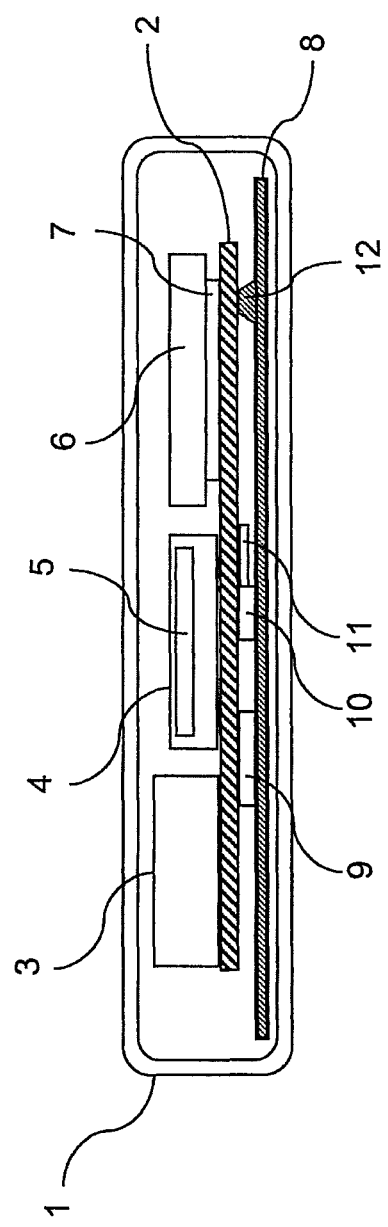

(51) Int. Cl.
*G07C 9/00* (2006.01)
*H01Q 1/32* (2006.01)
*H01Q 7/00* (2006.01)
*H01Q 5/35* (2015.01)
*H01Q 5/40* (2015.01)

(56) References Cited

U.S. PATENT DOCUMENTS

2009/0222338 A1* 9/2009 Hamilton et al. ............... 705/14
2011/0148574 A1* 6/2011 Simon et al. .................. 340/5.61

FOREIGN PATENT DOCUMENTS

WO WO 00/44066 7/2000
WO WO 2009/147225 A1 12/2009

OTHER PUBLICATIONS

International Search Report of International Application No. PCT/EP2011/071956 dated Apr. 3, 2012 and English translation.

* cited by examiner

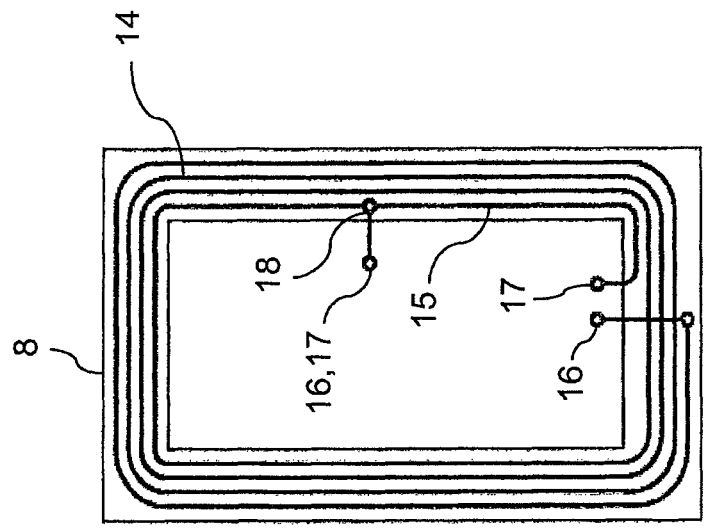
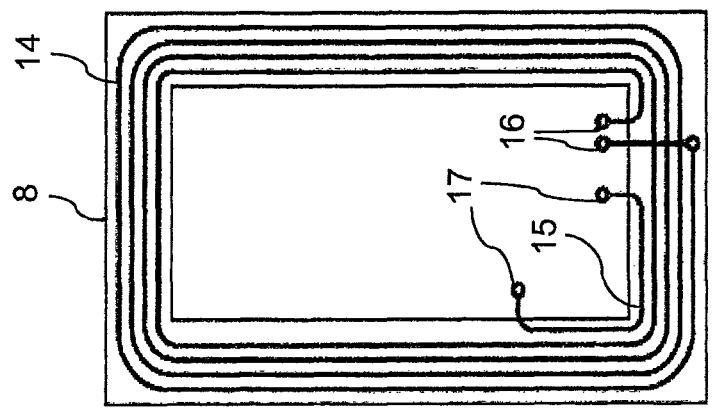
Fig. 4A
Fig. 4B

COMPACT ID TRANSMITTER COMPRISING AN NFC COMMUNICATIONS OPTION FOR A MOTOR VEHICLE ACCESS SYSTEM

The invention relates to an ID transmitter for a motor vehicle access system, exhibiting a plastic housing and a printed circuit board, which is enclosed in the housing and is populated with components and exhibits conductors, wherein the components comprise, among other items, a power supply cell with an associated bracket, an LF 3D coil assembly and HF transceiver components for communicating with vehicle-side transceiver devices, and at least one controller component.

With known ID transmitters of the type specified above, the printed circuit board ("PCB") disposed in the plastic housing is populated with components on both sides. An HF antenna coupled to the HF transceiver components is designed as a conductor on the printed circuit board, wherein this conductor, forming the antenna, is normally disposed in the proximity of the edge of the printed circuit board in a region of the printed circuit board not populated with components. The LF 3D coil assembly is designed, for example, as a compact component having three receiver coils oriented in the three spatial planes, wherein a Z-coil, which lies parallel to the printed circuit board surface, and two coils (X- and Y-coils), offset by 90°, having coil windings perpendicular to the printed circuit board, are disposed in the interior thereof.

Based on the known ID transmitter, the basic objective of the invention consists of, on the one hand, creating a compact ID transmitter having a printed circuit board of a minimum size, and, on the other hand, to equip this ID transmitter with an NFC communication possibility.

This objective is attained according to the invention by means of an ID transmitter having the characteristics of Claim 1. The ID transmitter for a motor vehicle access system, according to the invention, exhibits a plastic housing, and a printed circuit board populated with components and conductors, enclosed in the housing, wherein the components comprise, among other items, a power supply cell (e.g. a battery) with an associated bracket, an LF 3D coil assembly, an HF transceiver components for communicating with vehicle-side transceiver devices, an NFC module, and at least one controller component. Furthermore, the ID transmitter exhibits an antenna sub-assembly connected to the printed circuit board, disposed next to the printed circuit board, in the form of a carrier film carrying conductor tracks, wherein the conductor tracks form an NFC antenna coil, which is coupled to the NFC module by means of the conductors of the printed circuit board. The carrier film is disposed substantially in a plane parallel to the printed circuit board, and extends on all sides over the edge of the printed circuit board, wherein the conductor tracks forming the NFC antenna coil are substantially disposed in the edge surface region of the carrier film extending over the edge of the printed circuit board.

The design according to the invention for the ID transmitter enables, on one hand—through the appropriate configuration of the components—a printed circuit board of a minimal size, and on the other hand, the least possible negative effect to the performance of the NFC communication via the NFC antenna coil by means of the printed circuit board, which is densely populated with components and provided with conductors, and thus acting in a shielding manner. By means of the displacement of the NFC antenna coil to a separate component, at a distance to the printed circuit board, specifically in an antenna sub-assembly connected to the printed circuit board in the form of a carrier film carrying conductor tracks, and by means of the positioning of conductor tracks forming the NFC antenna coil substantially beyond the edge of the printed circuit board, a good NFC communication range at both sides of the printed circuit board is enabled, because the NFC antenna coil is, at most, only shielded to a slight degree by the printed circuit board densely populated with components and conductor tracks. A configuration of the components that is as dense as possible on the printed circuit board also results in a minimal size of the printed circuit board and correspondingly, a minimal size of the carrier film as well. The carrier film is "substantially" disposed in a plane parallel to the printed circuit board, meaning that it can also be tilted (e.g. depending on the assembly) to a slight degree (at an acute angle), or slightly bowed. It is decisive thereby that the carrier film and the printed circuit board are disposed inside a flat plastic housing, such that they are adjacent to one another in a two-dimensional manner. The thickness of the plastic housing is thus substantially determined by the structural height of the printed circuit board, which is populated on both sides; the carrier film itself is of a negligible thickness. The lateral dimensions of the plastic housing are substantially determined by the size of the printed circuit board, or the size of the carrier film extending over the edges of the printed circuit board. The carrier film extends on all sides over the edges of the printed circuit board, such that numerous windings of an NFC antenna coil can be disposed entirely within this overhanging region of the carrier film. The NFC antenna coil normally exhibits few antenna windings, e.g. four windings. These conductor tracks forming the NFC antenna coil are "substantially" disposed in the overhanging edge surface region, meaning the major portion (with four windings, this is at least three windings, for example) is disposed in this edge surface region.

In a preferred embodiment of the ID transmitter according to the invention, the components of a larger structural height, including the power supply cell with the associated bracket, the LF 3D coil configuration and the NFC module, are disposed adjacent to one another on one surface of the printed circuit board, and the antenna sub-assembly is disposed on the other surface of the printed circuit board. The components of a smaller structural height, such as surface mounted chips for active components (controller or transceiver), or passive components (resistors, capacitors), can be disposed on that side of the printed circuit board on which the antenna sub-assembly is also disposed. The components of a "larger" structural height are understood to be those components which cannot be attached as flat, surface mounted chips. By way of example, the power supply cell (or "battery") with its associated bracket normally exhibits a height of at least 2 mm. The LF 3D coil assembly contains three coil packets oriented in the three spatial planes, whereby the height of this component is determined by the coil packets, which are oriented in an axis disposed parallel to the printed circuit board surface. In order to obtain a sufficient cross-section surface within the windings, the LF 3D coil assembly component must exhibit a minimum structural height of a few millimeters. Finally, the NFC module also normally has an structural height of a few millimeters. Preferably, it comprises a chip card mount for a removable NFC chip card, having, for example, the format of a micro-SD card. The NFC chip card mount must exceed the thickness of the NFC chip cards that can be placed therein, in order to ensure a sufficient mechanical stability.

A preferred further development of the latter specified embodiment is characterized in that the LF 3D coil assembly and the NFC module each exhibit a substantially rectangular base surface, and the LF 3D coil assembly, the NFC module and the power supply cell with its associated bracket, are disposed on one surface of the printed circuit board, successively in a spatial direction, without spacing, or with a limited spacing between them, and the surface area of the printed circuit board corresponds substantially to the sum of the surface areas occupied by these components. The three specified components of a larger structural height are disposed successively in a longitudinal axis of the printed circuit board, wherein the rectangular surface area of the printed circuit board corresponds substantially to the sum of the three rectangular surface areas occupied by the respective components. The components are disposed without spacing to one another, or with a limited spacing, due to technological factors, successively. The limited spacing, due to technological factors, is derived from dimensional tolerances. Preferably, a power supply cell is used, which occupies a circular surface area having a diameter of approx. 20 mm, and the printed circuit board is approx. 20 mm wide, and between 40 and 48 mm, preferably 44 mm, long.

The carrier film of the antenna sub-assembly can be relatively rigid, but is preferably slightly flexible, in order to facilitate the assembly, and to be able to accommodate technological tolerances. The flexibility of the carrier film should not, however, be so great that creases or folds occur in the NFC antenna coil during the assembly.

In a preferred further development of the ID transmitter according to the invention, the conductor tracks of the antenna sub-assembly comprise a conductor track for an HF antenna, coupled to the HF transceivers via conductors of the printed circuit board. The displacement of the HF antenna outside of the printed circuit board in a conductor track of the carrier film of the antenna sub-assembly as an external component improves the transceiver characteristics of the HF antenna, because it enables a reduction of the disturbances and the shielding by means of the densely populated printed circuit board. Preferably the conductor track for the HF antenna is likewise disposed in the overhanging edge surface region of the carrier film.

In a preferred further development, the conductor track for the HF antenna is disposed in the interior of the carrier film, inside of the conductor tracks of the NFC antenna coil. By way of example, the conductor track for the HF antenna extends in sections parallel to the innermost winding of the NFC antenna coil.

In an alternative embodiment, the HF antenna and the NFC antenna coils are formed by a single, spiral-shaped conductor track, wherein the conductor track exhibits two end connections, and a pickup disposed on the innermost winding of the conductor track, such that the conductor track section between the pickup and the inner end connection forms the HF antenna, and the remaining section forms the NFC antenna coil. The end connections of the conductor track, and the pickup are connected directly to a conductor on the printed circuit board.

Advantageous and/or preferred further developments of the invention are characterized in the dependent Claims.

Figure 3:
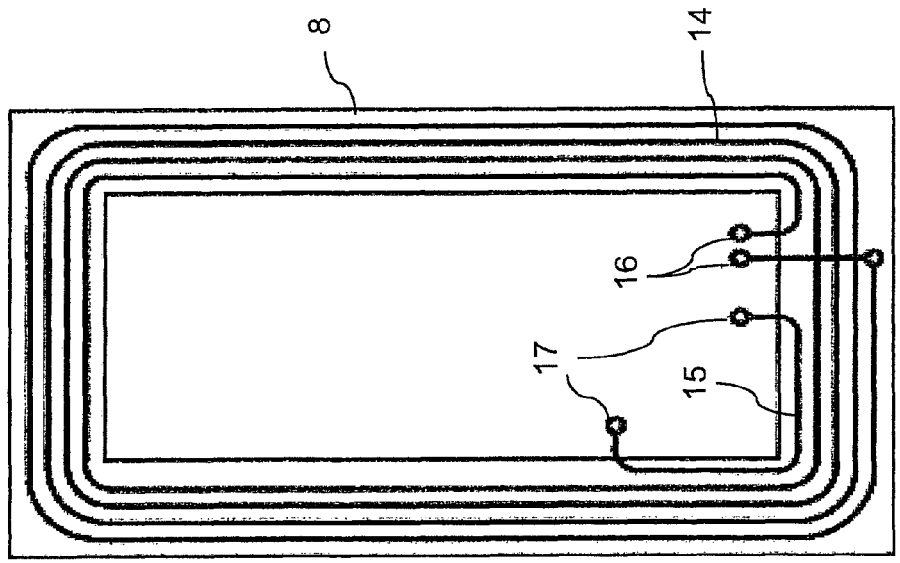
Figure 2B:
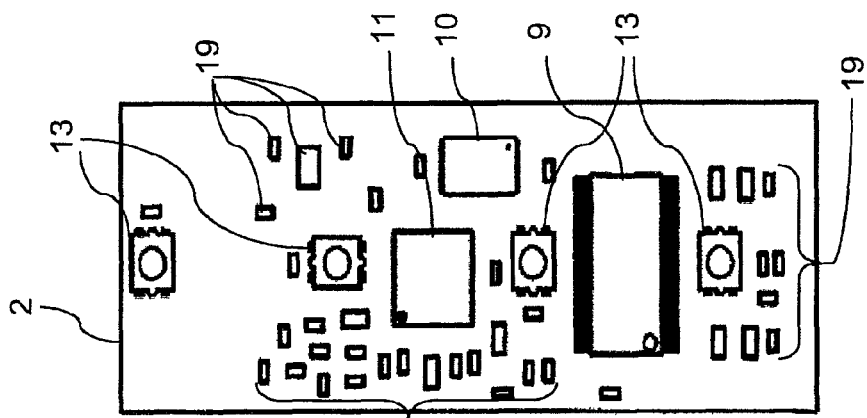
Figure 2A:
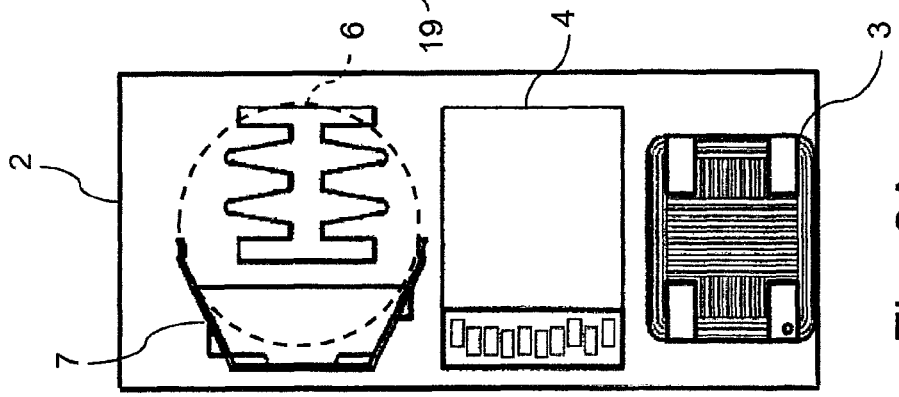

In the following, the invention shall be explained in greater detail, based on the preferred embodiments depicted in the drawings. Shown in the drawings are:

FIG. 1: a schematic longitudinal sectional depiction of the ID transmitter according to the invention;

FIGS. 2A and 2B: a schematic depiction of the two surfaces of the printed circuit board for the ID transmitter, with the components assembled thereon;

FIG. 3: a schematic depiction of the antenna sub-assembly, which is disposed parallel to the printed circuit board depicted in the FIGS. 2A and 2B; and FIGS. 4A and 4B: two alternative embodiments of the antenna sub-assembly for an ID transmitter according to the invention, having a printed circuit board deviating from that in FIG. 3 in terms of the length-to-width ratio.

FIG. 1 shows a schematic depiction of a longitudinal section cut through an ID transmitter according to the invention. A printed circuit board 2 (also referred to as a "PCB") is disposed in a plastic housing 1. The printed circuit board 2 is, for example, rectangular in shape, wherein FIG. 1 shows a sectional view cut along the longer dimension. The housing 1 consists, for example, of two shells welded together, these being a lower shell and an upper shell. The housing normally contains projections and recesses in the interior for the form-locking anchoring of the printed circuit board 2 inserted therein. The printed circuit board 2 contains (not shown in FIG. 1) conductors, and is designed as a double-sided printed circuit board, wherein there are conductors formed on the lower surface and the upper surface of the printed circuit board 2. Numerous components are installed on the upper surface of the printed circuit board (in the orientation shown in FIG. 1), these being an LF 3D coil assembly 3, an NFC chip card mount 4 for receiving an NFC chip card 5 and a bracket 7 for a power supply cell 6 (or battery). The LF 3D coil assembly 3 comprises three coils incorporated in a plastic housing, which are oriented in three spatial planes, perpendicular to one another, wherein the assembly surface, meaning the printed circuit board upper surface, is the vertical spatial plane, designated as the Z-axis. As can be better seen in FIG. 2A, which shows a top view of the populated printed circuit board 2, the windings of a coil designated as the Z-coil, are parallel to the printed circuit board surface, and are disposed on the outer edge of the component 3. Two coils, offset to one another at 90°, having coil windings perpendicular to the printed circuit board 2, are disposed in the interior of this outer Z-coil, which are designated as X-coils and Y-coils. As is indicated in FIG. 2A, one of the two coils is disposed, in turn, inside of the other coil. The six connections for the three coils are connected to contacts of the conductors of the printed circuit board 2. The LF 3D coil assembly 3 serves to receive the wake-up signals in the LF frequency range, in a frequency of 125 kHz, for example. The winding connections for the LF 3D coil assembly 3 are coupled to input connections of an LF receiver circuit, which is designed as an integrated circuit, and is likewise installed on the printed circuit board 2.

Furthermore, a bracket 7 for a power supply cell 6 is installed on the upper surface of the printed circuit board 2. A 3V battery, type CR2032, for example, is used as the power supply cell 6. The bracket 7 installed on the upper surface of the printed circuit board also forms a contact for the battery.

The ID transmitter according to the invention is also equipped with an NFC communication possibility (NFC="Near Field Communication"). For this purpose, an NFC chip card mount 4 is installed on the upper surface of the printed circuit board 2. The chip card mount 4 enables the insertion and removal of an NFC chip card, which is also designated as an "NFC secure element." This NFC chip card contains transceiver circuits for high-frequency communication, at a carrier frequency, for example, of 13.56 MHz. This NFC chip card has the format, for example, of a micro-SD card. Furthermore, the NFC chip card contains circuits for encoding and decoding the transmitted signals, as well as controller and interface circuits. By way of example, the NFC chip card contains contacts, disposed in the proximity of a narrow side, for a power supply (supply voltage and ground) and for data transfer (data signals and timing), as well as for coupling to an antenna assembly. Although the NFC chip card is normally equipped with an antenna, the coupling to an external NFC antenna coil serves to increase the communication range. A preferred embodiment of the NFC chip card also contains an interface for a USB bus, preferably on the narrow side of the chip card opposite the contacts specified above. The NFC chip card is preferably removable, such that the housing 1 of the ID transmitter is preferably provided with a lid or a closure, which enables the opening and closing of an insertion slot in the NFC chip card mount 4, for inserting and removing the NFC chip card 5.

The components 3, 4, and 6, normally only a few millimeters high, are disposed directly adjacently to one another and successively in the longitudinal axis of the printed circuit board 2. As can be seen in FIG. 2A, which shows a top view of the printed circuit board 2, the surface area of the printed circuit board 2 corresponds substantially to the sum of those surface areas occupied by the LF 3D coil assembly 3, the NFC chip card mount 4 and the battery 6 with its associated bracket 7.

As can be derived from FIG. 1 in conjunction with FIG. 2B, which schematically depicts the back surface of the printed circuit board 2, the remaining components that populate the printed circuit board 2 are preferably disposed on the back surface of the printed circuit board 2. These components comprise at least a controller 9, an oscillating crystal 10, and a transceiver 11. The transceiver 11 serves for the communication with a vehicle-side transceiver in the HF frequency range, at 315 MHz or 433 MHz, for example. Moreover, there are four key switches 13 disposed on the back surface of the printed circuit board 2, which can be actuated by a user via associated buttons in recesses of the housing 2. The buttons 13 serve to trigger predetermined functions of the ID transmitter, in order to trigger, for example, an unlocking or locking of the motor vehicle doors. Furthermore, the back surface of the printed circuit board 2 is populated with diverse passive and active components 19.

An antenna sub-assembly in the form of a carrier film 8 carrying conductor tracks, is disposed adjacent to the back surface of the printed circuit board 2, and substantially parallel thereto. This carrier film 8 with conductor tracks is schematically depicted in FIG. 3. The conductor tracks comprise an NFC antenna coil 14, having four windings, for example, wherein the end connections 16 of the NFC antenna coil 14 are connected to conductors of the printed circuit board 2. The conductors of the printed circuit board couple the NFC antenna coil to corresponding connections for the NFC chip card mount 4. FIG. 1 shows a section 12 of the carrier film 8 containing the connections 16, which serves to fasten the antenna sub-assembly to the back surface of the printed circuit board 2. Furthermore, as can be seen in FIG. 3, a conductor track 15, having end connections 17, is located on the carrier film 8, which serves as an HF antenna for communicating with vehicle-side transceivers. The connections 17 of the HF antenna 15 are likewise connected to the conductors of the printed circuit board 2 by means of associated contacts. The carrier film 8 is preferably a flexible film, which is, however, stiff enough to ensure a stability of the windings of the NFC antenna coil. The carrier film 8 attached to the back surface of the printed circuit board 2 is slightly larger, i.e. wider and longer, than the printed circuit board 2, such that an edge region of the carrier film 8 is formed, extending over the edges of the printed circuit board 2 when the carrier film 8 is installed in a centered manner on the back surface of the printed circuit board 2. The antenna conductor tracks 14 and 15 are disposed thereby on the carrier film 8 in such a manner that they are substantially entirely disposed in the overhanging edge region. By this means, it is ensured that the printed circuit board 2, densely populated with components and conductors, does not shield the antenna conductor tracks 14 and 15 in such a manner that the communication is compromised.

FIGS. 4A and 4B show alternative embodiments of the carrier film 8 for the antenna sub-assembly with the conductor tracks 14 and 15 installed thereon. The films depicted in FIGS. 4A and 4B differ from the film 8 shown in FIG. 3 in terms of their length-to-width ratios, and are accordingly provided for associated printed circuit boards 2 having corresponding length-to-width ratios. With the embodiment examples of the carrier film 8 depicted in FIG. 3 and FIG. 4A, separate conductor tracks are provided for the NFC antenna coil (conductor path 14) and for the HF antenna (conductor track 15). The NFC antenna coil 14 is connected to the printed circuit board 2 by means of the connection 16, while the HF antenna is connected to the printed circuit board 2 by means of the contact 17. In an alternative embodiment, the HF antenna can also be coupled to the printed circuit board 2 by means of only one single contact. In the embodiment depicted in FIG. 4B, the HF antenna and the NFC antenna coil are formed from a single spiral-shaped conductor track. The conductor track 14, 15 exhibits a pickup 18. The HF antenna 15 is formed between the pickup and the inner connection of the conductor track spiral, while the rest of the conductor track forms the NFC antenna coil.

In a preferred embodiment, the printed circuit board 2 exhibits a length of 44 mm, for example, and a width of 20 mm, such that the width of the printed circuit board 2 corresponds approximately to the diameter of a battery, type CR2032. The LF 3D coil assembly exhibits, for example, dimensions of 11 mm×11 mm, or 15 mm×15 mm. The overlapping region of the carrier film 8 has a width, for example, of between 2 and 5 mm.

The mount for the batter 6 can be designed in one embodiment such that a replacement of the battery is possible. In another embodiment, it can be provided that after the complete draining of the battery, the ID transmitter is discarded and replaced with a new one. In another embodiment, it can be provided that the ID transmitter contains a circuit for recharging the battery 6, wherein the energy that is to be transferred for the recharging is acquired from the LF 3D coil assembly.

The invention claimed is:

1. An ID transmitter for a motor vehicle access system, comprising:
   a plastic housing,
   a printed circuit board enclosed in the housing and populated with components and conductors, wherein the components comprise, among other items, a power supply cell with an associated bracket, an LF 3D coil assembly and an HF transceiver for communicating with vehicle-side transceivers, an NFC module, and at least one controller component,
   an antenna sub-assembly in the form of a carrier film carrying conductor tracks, disposed next to the printed circuit board, and connected to the printed circuit board, wherein the conductor tracks form an NFC antenna coil, which is coupled to the NFC module via the conductors of the printed circuit board,
   wherein the carrier film is disposed in a plane substantially parallel to the printed circuit board, and extends on all sides beyond the edges of the printed circuit board, wherein the conductor tracks forming the NFC antenna coil are disposed substantially in the edge surface region of the carrier film extending beyond the edges of the printed circuit board.

2. The ID transmitter according to claim 1, wherein the components having a larger structural height, including the power supply cell with its associated bracket, the LF 3D coil assembly and the NFC module are disposed on one side of the printed circuit board, adjacent to one another, and the antenna sub-assembly is disposed on the other side thereof.

3. The ID transmitter according to claim 2, wherein the LF 3D coil assembly and the NFC module each exhibit a substantially rectangular base surface, and the LF 3D coil assembly, the NFC module and the power supply cell, with its associated bracket are successively disposed spatially on the printed circuit board without spacing, or with a limited spacing, and the surface area of the printed circuit board substantially corresponds to the sum of the surface areas occupied by these components.

4. The ID transmitter according to claim 3, wherein the power supply cell occupies a circular surface area having a diameter of approx. 20 mm, and the printed circuit board is approx. 20 mm wide and between 40 mm and 48 mm long, preferably 44 mm long.

5. The ID transmitter according to claim 1, wherein the carrier film is flexible.

6. The ID transmitter according to claim 1, wherein the conductor tracks for the antenna sub-assembly comprise a conductor track for an HF antenna, connected to the HF transceiver components via a conductor of the printed circuit board.

7. The ID transmitter according to claim 6, wherein the conductor track for the HF antenna is likewise disposed in the overhanging edge surface region of the carrier film.

8. The ID transmitter according to claim 7, wherein the conductor track for the HF antenna is disposed in the interior of the carrier film inside of the conductor tracks for the NFC antenna coil.

9. The ID transmitter according to claim 6, wherein the HF antenna and the NFC antenna coil are formed from one single spiral-shaped conductor track, wherein the conductor track exhibits two end connections and a pickup disposed on the innermost winding of the conductor track, such that the conductor track section between the pickup and the inner connection forms the HF antenna, and the remaining section forms the NFC antenna coil.

10. The ID transmitter according to claim 1, wherein the NFC module comprises an NFC chip card mount for an NFC chip card.

* * * * *